April 3, 1956     G. GUASCO     2,740,322
APPARATUS FOR EYE EXAMINATIONS
Filed Sept. 5, 1951     2 Sheets-Sheet 1
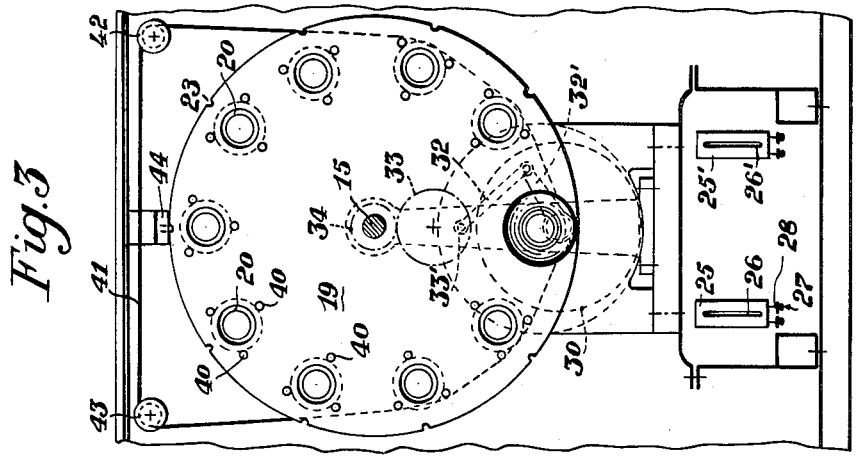
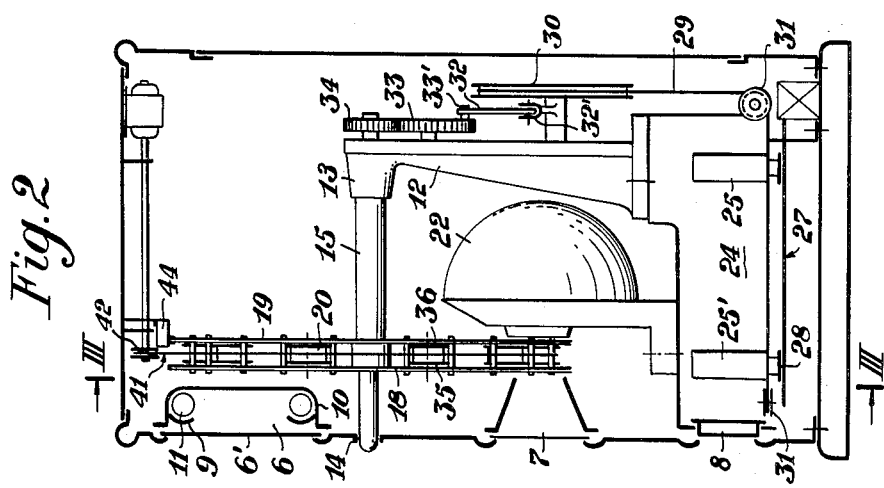
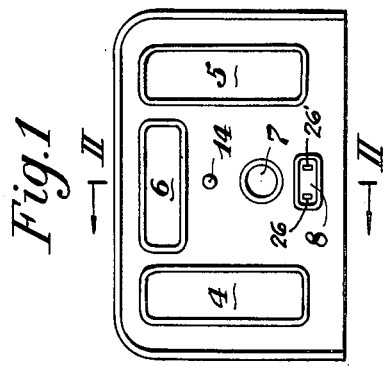
INVENTOR:
GIUSEPPE GUASCO
BY *Leon M. Strauss*
AGT.

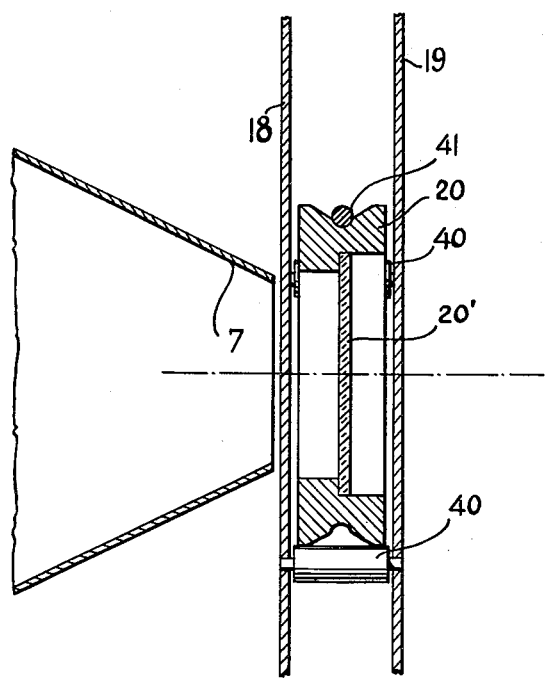

United States Patent Office 2,740,322
Patented Apr. 3, 1956

2,740,322
APPARATUS FOR EYE EXAMINATIONS
Giuseppe Guasco, Rome, Italy

Application September 5, 1951, Serial No. 245,127

Claims priority, application Italy September 5, 1950

2 Claims. (Cl. 88—20)

The present invention relates to ophthalmic instruments and the object of the invention is to provide an apparatus which permits carrying out the following investigations:

(A) In the field of ophthalometry—
1. Determination of visual acuity either at white light of variable intensity or colored light of any color in the spectrum and determination of the optimum individual lighting compared to standard. Diagnosis of nyctalopia.
2. Determination of the minimum individual lighting compared to standard. Determination or degree of visual acuity at twilight, whereby a person may discern only targets exposed to full light, but cannot vision a target in the shade or scarcely lit.
3. Determination of individual sensibility to differences in light intensity.
4. Determination of power of adaptation to darkness, that is to say of the time which is required for recovering the sight after dazzling either in normal or trial conditions.

(B) Investigations about color perception.
(C) Determination of depth perception or binocular stereopsis.
(D) Measure of the swiftness of visual perception and of visual memory.

It is an object of the present invention to provide means permitting the consecutive illumination of targets with a varying light intensity and with a multiplicity of colors.

It is another object of the present invention to provide means ensuring examination and measurement of the refractive powers and defects of the human eye.

Still another object of the invention resides in the provision of means conducive to a very efficient and highly economical apparatus construction for carrying out examintion and comparative tests in the medical field, in particular in ophthalometry.

Additionally, the apparatus according to the invention can be used for gradual training of certain forms of Daltonism or chromatic deviation and for complementary orthoptic exercises.

The description of the invention will be more easily followed by reference to the annexed drawings in which a preferred embodiment of the invention is shown by way of a non-limitative example.

In the drawings:
Fig. 1 is a front view of the aparatus embodying the invention;
Fig. 2 is, on an enlarged scale, a partly sectional view of the same apparatus as in Fig. 1 taken on line II—II of Fig. 1;
Fig. 3 shows the interior of the same apparatus with a section thereof taken on line III—III of Fig. 2;
Fig. 4 is an enlarged, fragmentary and vertical sectional view through an observation window of the apparatus and disc means and test target referred to in the specification.

With reference to the attached drawings, the apparatus shows to the examinee two normal test charts 4 and 5, one of which is for illiterates. Another chart 6 carries a number of tests of different colors, each of them countersigned by a reference letter or the like, which the examinee will refer to for the purpose of comparison with the color of the test target 20' (Fig. 4) appearing at a window 7 which may be called "variable target" and through which, successively, test targets of different colors, dimensions and luminosity may be perceived.

Charts 4, 5 and 6 are illuminated due to their transparency from the interior of the apparatus by means of a source of white light free from red.

Fig. 2 shows in section chart 6 which comprises an opaque wall 10 and a glass sheet 6' serving as front lid to said wall and carrying the tests of different colors which are illuminated by properly positioned lamps 11.

Between said lamps 11 and glass sheet 6' transparent screens or filters 9 can be placed according to requirements in order to obtain tests with correct colors.

A stanchion 12 is mounted inside the apparatus, and carries at its upper end a support 13 which, in co-operation with another support 14 fixed to the front wall of the apparatus maintains a shaft 15 in horizontal position which revolves together with a pair of discs 18 and 19 each provided adjacent their periphery with a number of corresponding holes, each of which being defined by a ring 20. Said rings are constructed to rotate between said two discs and are supported by rollers 40. Discs 18 and 19 are connected to each other and turn simultaneously, whereas the rotation of rings 20 takes place independently of said discs.

A belt 41 is mounted on pulleys 42, 43, on discs 18, 19, and on rings 20. Pulley 42 is a driving pulley. During its rotation said belt 41 engages some of the rings 20 and rotates them. An electro-magnetic relay 44 is suitably located in order to stop discs 18, 19 by engaging within notches 23 located opposite said rings. When pulley 42 is actuated the rings 20 engaged by belt 41 turn. On the other hand, the discs 18, 19 can only turn when the relay 44 is disengaged from one of the notches 23. The discs 18, 19 are in such a position when the relay 44 engages one of the notches 23 that one of the rings 20 is always in alignment with the variable target 7.

The belt 41 contacts several of the rollers 40 in association with the rings and the actuation of the belt effects rotation of the discs 18 and 19 which are joined by rollers 40. Such rotation of discs 18 and 19 can be effected only when said discs are free, i. e., when relay 44 is disengaged from noches 23. Since rings 20 are supported freely by rollers 40, rotation of the rings is not dependent upon rotation of the discs; rather, the rings are rotatable relative to and independent of said discs, both being rotated by belt 41 when suitably positioned.

On rings 20 there are mounted discs of transparent material carrying test targets 20' of the decimal type (one target being only shown in Fig. 4), all similar to one another, or else there can be mounted two discs 35 and 36 on the first of which test targets are indicated by perforated delineation or outline on a support of an opaque material, whereas the second disc which is made of translucent material, is destined to be variously illuminated by a reflector 22 housing a plurality of groups of electric bulbs, either clear or colored in the basic red, blue, green and yellow colors. These bulbs are symmetrically disposed, and they can be lit singly or as groups by applying current to each group independently from the other. Thus, light having different colors and varying intensity is produced.

It is a characteristic of the apparatus, that the test target perceived in window 7 may be shown with whatever position and with whatever inclination desired, as no rigid mechanical connection exists between the rotatable shaft 15 carrying discs 18 and 19 and the rotatable rings 20; the shaft and rings can be moved by a small independent electric motor, or any other suitable device, one at a time or some of them or all together, through the aforesaid belt engaged by all rings 20 or according to any other known manner.

Below or above lamp 22 is situated the stereometrical device consisting substantially of a rectangular case 24 showing on its front wall a window 8.

According to a preferred solution, two slides 25 and 25' are contained in case 24 and run along two small conductive bars 27 by means of guide shoes 28. Each of said slides carries a bulb to which current is supplied through bars 27 from a suitable electric power source (not shown), the light of which can be perceived through front opening 26.

Slides 25 and 25' may be animated by a reciprocating motion of a suitable mechanism of any known type.

According to the example shown in the drawings the motion is achieved by a gear 34 which is keyed to shaft 15 (Figs. 2 and 3), which gear engages another gear 33 which, at a predetermined location on its rear surface, is provided with a pivot 33'.

The head of a connecting rod 32 is hinged on said pivot 33' the base of the same connecting rod being pivoted on a crank 32' which, in turn, is keyed to a shaft fixed to a pulley 30.

A belt 29 engaged by said pulley 30 and trained over transmission rollers 31 is operatively connected with said two slides 25—25' in such a way that, by rotating wheel 34 said slides will accomplish to and fro displacements in a direction perpendicular to the front surface of the apparatus.

In operation, actuation of pulley 42 effects rotation of discs 18 and 19 through belt 41. Shaft 15 is rotated by the discs causing rotation of gear 34, which rotation is in turn imparted to gear 33 carrying pivot 33'. Connecting rod 32 transfers a reciprocating rotative motion to pulley 30 which is passed on to belt 29 which carries slides 25 and 25'. As the discs turn, belt 29 reciprocates, advancing one of the slides while retracting the other. For each position wherein a notch 23 of the discs is engaged by the relay 44 there is a corresponding position of slides 25 and 25' relative to each other. The examinee's ability to perceive depth can readily be determined by his estimate of the relative positions of the slides which are viewed through target opening 8. This test of depth perception can be effected along with the color test since the actuation of pulley 42 effects the shift of visible ring 20 simultaneously with the change in relative positions of the slides 25 and 25'.

The apparatus described hereabove is supplied with a luminous dial which repeats the position and the size of the tests shown in window 7 for the observation of the test target. Obviously said target may be repeatedly illuminated by a light repeater device of any known structure (not shown) only after the examinee has valued the dimensions or the color of the tests shown on the target.

The electric accessories, such as transformers, converters, current stabilizers, relays of the test charts, as well as the device allowing the measurement of the intensity of the light or the device for the distant control of lights and motors, are not described or shown in the drawings as they are all of known type.

Instead of the aforementioned electromagnetic relay 44 any other known latch means may be employed to effectuate step by step or intermittent rotative movement of discs 18, 19 by engagement with spaced apart notches 23 thereof.

Reverting to further window 8 it will be noted that slots or openings 26, 26' permit the observation of reciprocably movable and illuminated slides or targets 25, 25' to thereby examine depth perception of an examinee.

The above-mentioned discs 18, 19 are rotating, while to said slides reciprocable displacement movement is imparted from common drive means via belt 41 and via belt 29, respectively, said belt 29 being driven by a mechanism 32—24 operatively connected to shaft 15, as seen in Fig. 2.

Accordingly, there has been described an apparatus for testing visual acuity comprising a casing including a target opening, disc means rotatably mounted within said casing and provided with engageable formations, transparent ring means rotatably mounted on and movable relative to and independent of said disc means, means for rotating said disc means and said ring means at respective variable speeds, means cooperable with said engageable formations of said disc means for preventing rotation of said disc means and said ring means at preselected positions of said disc means, means for producing and projecting light of variable color and intensity through said transparent ring means onto said target, a further target opening in said casing, a pair of guide bars extending rearwardly of said further target opening, a slide on each of said guide bars, and reciprocating means for imparting reciprocating motion to each of said slides, rotation of said disc means actuating said reciprocating means through connecting means, whereby an observer can be tested for his ability to perceive color and depth, simultaneously.

Having thus described the invention, what is claimed as new and desired to be secured by Letters Patent, is:

1. An apparatus for testing the ability of vision of a person, comprising a casing including a window for perceiving a test target, disc means rotatably mounted within said casing, latch means engageable with said disc means to permit intermittent rotation of said disc means, transparent ring means mounted for rotation relative to and independently of said disc means, drive means for rotating said disc means and said ring means at respective variable speeds, means cooperable with said latch means for preventing rotation of said disc means at pre-selected positions of the latter, a test target connected to said ring means, and means housed in said casing for producing and projecting light of variable color and intensity, said light projecting means being disposed for alignment with said test target and said window, said ring means together with said target being registrable with said light projecting means in one of said pre-selected positions during rotation of said disc means, whereby said light is projected through said ring means onto said test target for illumination of the latter and for determination of the visual acuity of said person observing said test target through said window.

2. An apparatus set forth in claim 1, including a further window for target observation, a pair of guide bars extending rearwardly of said further window, a slide disposed on each of said guide bars for reciprocating motion thereon, means connecting said drive means with said slides and imparting said reciprocating motion to said slides, and a shaft journalled within said casing, said disc means being mounted on said shaft for rotation and rotating while said slides perform said reciprocating motion rearwardly of said further window, whereby relative displacement of said slides is produced during said rotation of said disc means for testing depth perception of said person through said further window.

References Cited in the file of this patent

UNITED STATES PATENTS

| 1,337,728 | Scott | Apr. 20, 1920 |
| 1,647,016 | Reaves | Oct. 25, 1927 |
| 1,920,428 | Park | Aug. 1, 1933 |
| 2,089,863 | Updegrave | Aug. 10, 1937 |
| 2,137,702 | Ruby | Nov. 22, 1938 |

FOREIGN PATENTS

| 449,047 | Great Britain | June 19, 1936 |